Patented Feb. 27, 1923.

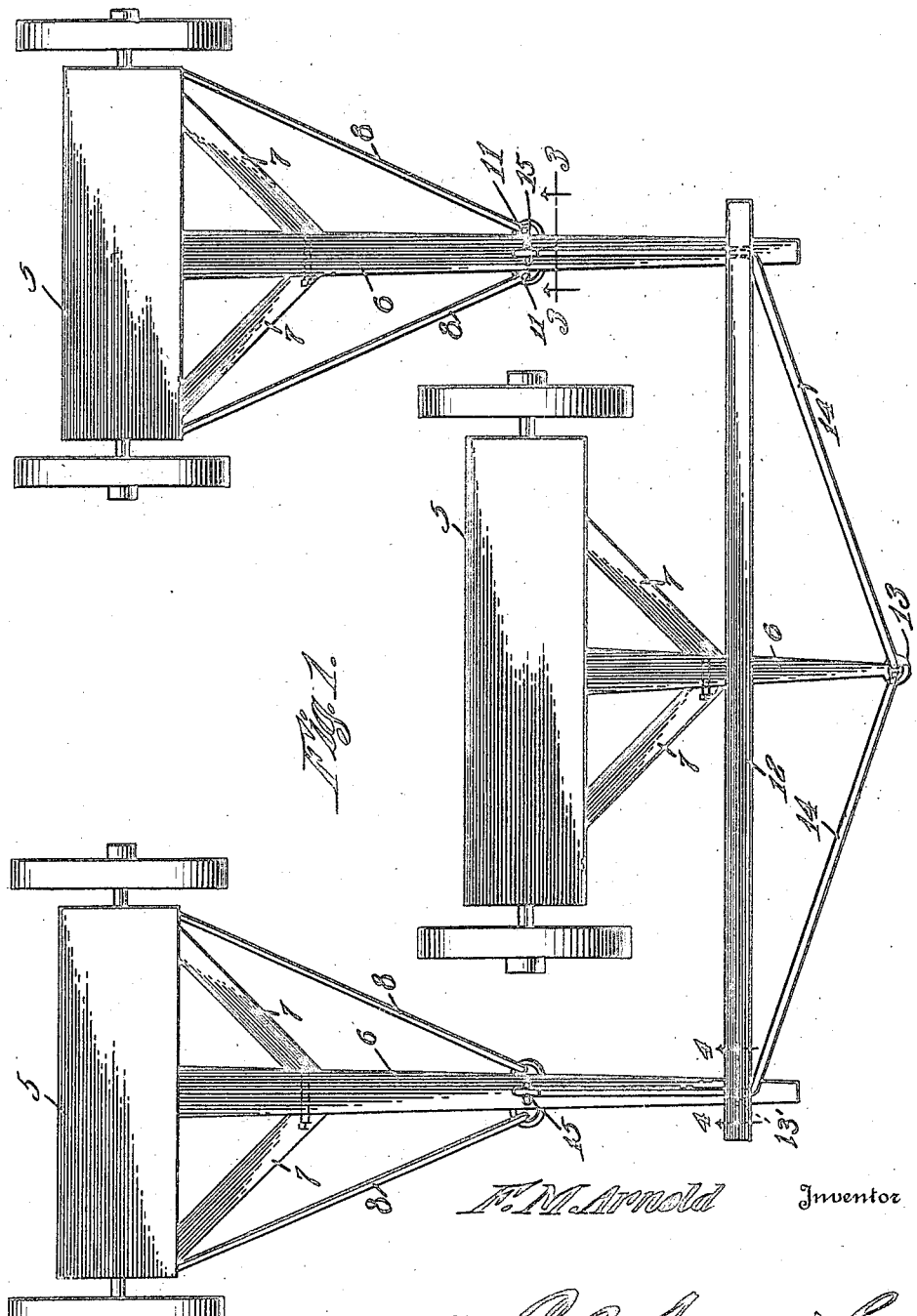

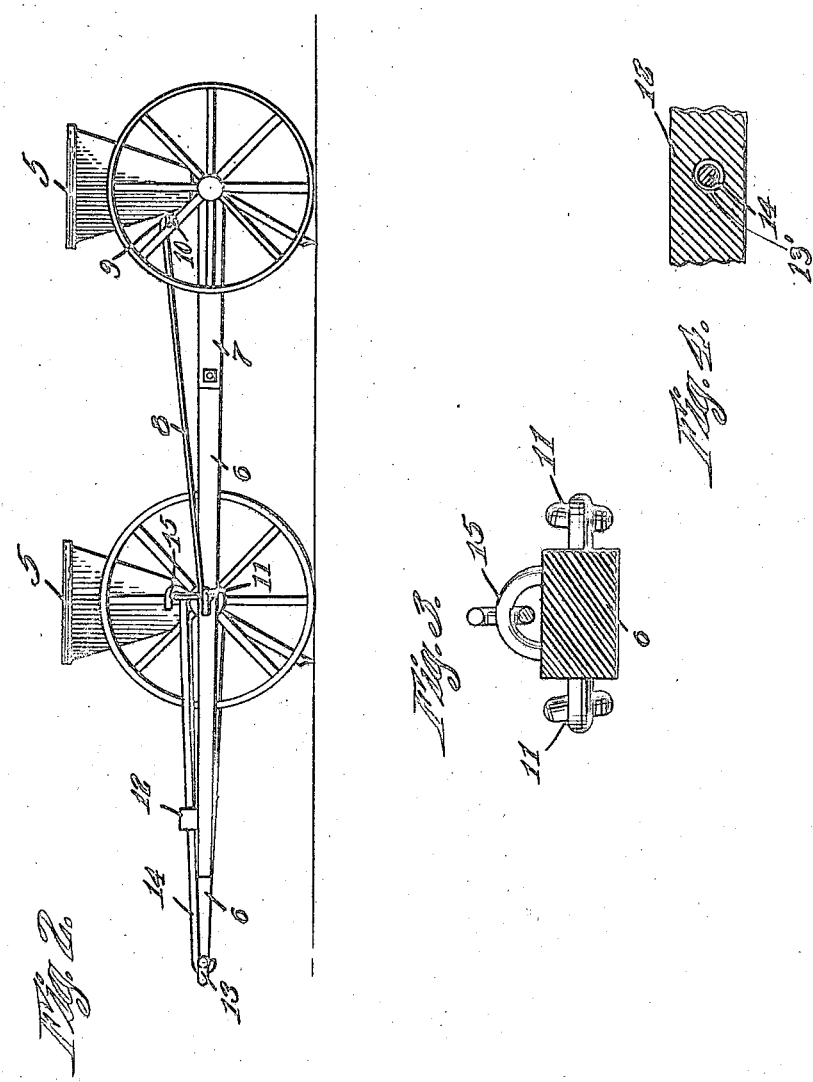

1,446,608

UNITED STATES PATENT OFFICE.

FRANK M. ARNOLD, OF ROZEL, KANSAS.

DRILL HITCH.

Application filed December 1, 1921. Serial No. 519,196.

*To all whom it may concern:*

Be it known that I, FRANK M. ARNOLD, a citizen of the United States, residing at Rozel, in the county of Pawnee and State of Kansas, have invented a new and useful Drill Hitch, of which the following is a specification.

This invention relates to hitches, and aims to provide novel means for hitching a number of grain drills or the like to a tractor to insure the grain drills being moved in parallel relation with the tractor.

Another object of the invention is to provide a hitch of this character which may be readily and easily applied by persons unfamiliar with mechanics.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1 is a plan view of a plurality of grain drills, showing the hitch as applied thereto.

Figure 2 is a side elevational view thereof.

Figure 3 is a sectional view taken on line 3—3 of Figure 1.

Figure 4 is a sectional view taken on line 4—4 of Figure 1.

Referring to the drawings in detail, grain drills are illustrated by the reference character 5, which grain drills are of the usual constructions and embody tongues 6 and brace bars 7, which connect the tongues to the body portions of the drills.

The hitches, forming the subject matter of the invention include brace rods 8, which have their inner ends formed into hook members as indicated at 9, which hook members are positioned within the staples 10.

The forward ends of the rods 8 are formed with hook members 11 which are positioned within the staple members 12, the staple members being secured to the tongues of the drills, at points intermediate the ends thereof.

A main or supporting bar indicated at 12 forms a part of the hitch, and as shown, the bar 12 is of a length to extend to points beyond the ends of the central drill, where the same may have connection with the tongues of the remaining drills, as clearly shown by Figure 1 of the drawings.

Formed in the bar 12 at points adjacent to the ends thereof are openings 13', which accommodate the rods 14 that also have connection with the tongues 6 as at 15. The central drill is also secured to the supporting bar 12 at a point intermediate its ends, the forward end of the tongue of the central drill being formed with an eye 13. The rods 14 have their forward ends connected to the tongue of the central drill as through the eye 13, as clearly shown by Figure 1 of the drawings.

Suitable means may be employed for connecting the tractor to the hitch structure, the connection being made through the eye 13. From the foregoing it will be seen that due to this construction, lateral movement of the grain drills with respect to the tractor used to move the drills, is prevented to the end that the grain will be drilled in even and unbroken rows.

Having thus described the invention, what is claimed as new is:—

In combination with a plurality of grain drills, a hitch device including a main supporting bar having openings disposed adjacent to the ends thereof, the tongues of the grain drills adapted to engage the supporting bar, rods for restricting lateral movement of the tongues with respect to the body portions of the grain drills, rods extending through the openings of the main supporting bar and having their rear ends connected to the tongues of the grain drills, and means for connecting the forward ends of the rods to the tongue of one of the grain drills.

In testimony that I claim the foregoing as my own, I have hereto affixed my signature in the presence of two witnesses.

FRANK M. ARNOLD.

Witnesses:
LOUIS BLATTNER,
F. M. DARSH.